(12) United States Patent
Krauss et al.

(10) Patent No.: US 6,357,795 B1
(45) Date of Patent: Mar. 19, 2002

(54) SEATBELT BUCKLE CARRIER UNIT

(75) Inventors: Walter Krauss, Germering; Thomas Schrott, Feldafing; Stephan Schwald, Herrsching, all of (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/644,372

(22) Filed: Aug. 23, 2000

(30) Foreign Application Priority Data

Feb. 28, 2000 (DE) .......................................... 100 09 422

(51) Int. Cl.⁷ ...................... B60R 22/18; B60R 22/195
(52) U.S. Cl. .................. 280/801.1; 280/806; 297/480; 297/482
(58) Field of Search .............................. 280/801.1, 806; 297/468, 480, 481, 482

(56) References Cited

U.S. PATENT DOCUMENTS 4,133,556 A * 1/1979 Glinski .................... 280/801.1
4,141,573 A * 2/1979 Ellens ..................... 280/801.1
4,928,992 A * 5/1990 Qvint et al. ............. 280/801.1
5,725,249 A * 3/1998 Nishide et al. ............. 280/806

FOREIGN PATENT DOCUMENTS

| DE | 91121213 | | 2/1992 |
| DE | 91019532 | | 7/1992 |
| DE | 4230664 | | 3/1994 |
| DE | 19654277 | | 6/1998 |
| FR | 2 726 521 | * | 5/1996 |
| JP | 4-310452 | * | 11/1992 |
| JP | 5-147499 | * | 6/1993 |
| JP | 9-267711 | * | 10/1997 |

* cited by examiner

*Primary Examiner*—Peter C. English
(74) *Attorney, Agent, or Firm*—Lonnie Drayer

(57) ABSTRACT

A seat belt buckle carrier unit free from rattling noises having a connecting element held in a specific place by a fixing device. The fixing device can be formed by a spring steel wire which is fixed at one end and with its free end, exerts pressure on the connecting element. To ensure reliable contact between the spring steel wire and the connecting element, the spring steel wire can have, at its end exerting a pressure on the connecting element, a loop that surrounds the connecting element.

6 Claims, 2 Drawing Sheets

SEATBELT BUCKLE CARRIER UNIT

FIELD OF THE INVENTION

The invention relates to a buckle carrier unit for a seat belt system in a vehicle.

BACKGROUND OF THE INVENTION

Owing to the low travelling noise level achieved nowadays in the automotive industry any sources of noise seem more unpleasant than in motor vehicles having a high travelling noise level. In particular noises caused by the striking together of individual components within the passenger compartment are found to be unpleasant and disturbing by vehicle occupants.

One source of these disturbing rattling noises can be a seat belt buckle carrier unit that strikes, for example, against a central console or a seat during travel. This is the case, in particular, if the passenger seat to which this buckle carrier unit belongs is unoccupied and/or the space between this seat and the central console is relatively narrow as, for example, in sports cars, small cars, etc.

In practice, strips of felt have been stuck onto the duct cover surrounding the connecting element to avoid these rattling noises. However, a solution of this type does not meet the design requirements encountered nowadays in the automotive industry. Furthermore, the provision of these felt strips necessitates additional handling procedures during assembly of the vehicle.

A further problem associated with seat belt buckle carrier units arises if a pretensioner is provided for the buckle of the carrier unit. The pretensioner should retract the buckle to a defined extent in the event of a crash. To enable this to take place without interruption, it must be ensured that the buckle does not hook on other components located in the passenger space during the pretensioning process.

SUMMARY OF THE INVENTION

There is provided in accordance with the present invention a seat belt buckle carrier unit that prevents the occurrence of rattling noises while allowing disturbance-free retraction of the buckle of the seat belt buckle carrier by a pretensioner.

The present invention provides a seat belt buckle carrier unit comprising a connecting element and a fixing device. In a preferred embodiment, the fixing device is formed by a spring steel wire, which is fixed at one end and with its free end, exerts pressure on the connecting element. The position of the spring steel wire ensures that the connecting element and the buckle adopt a predetermined defined position. This position can be selected in such a way that the seat belt buckle carrier unit, in particular the buckle, rests on the external contour of the associated passenger seat. The seat belt buckle carrier unit is therefore reliably prevented from striking against other parts in the passenger space. If a pretensioner is provided, it is also ensured that the buckle and the connecting element each invariably adopt a position, which is such that they cannot hook on other parts located within the passenger space in the event of a crash.

BRIEF DESCRIPTION OF THE DRAWINGS

Further advantageous developments and an embodiment of the seat belt buckle carrier unit according to the invention will be described hereinafter in conjunction with the drawings. The terms "top", "bottom", "right" and "left" used in conjunction with the description of the embodiments relate to the orientation of the drawings as viewed in the normal way.

DETAILED DESCRIPTION OF THE INVENTION

Figure 1:
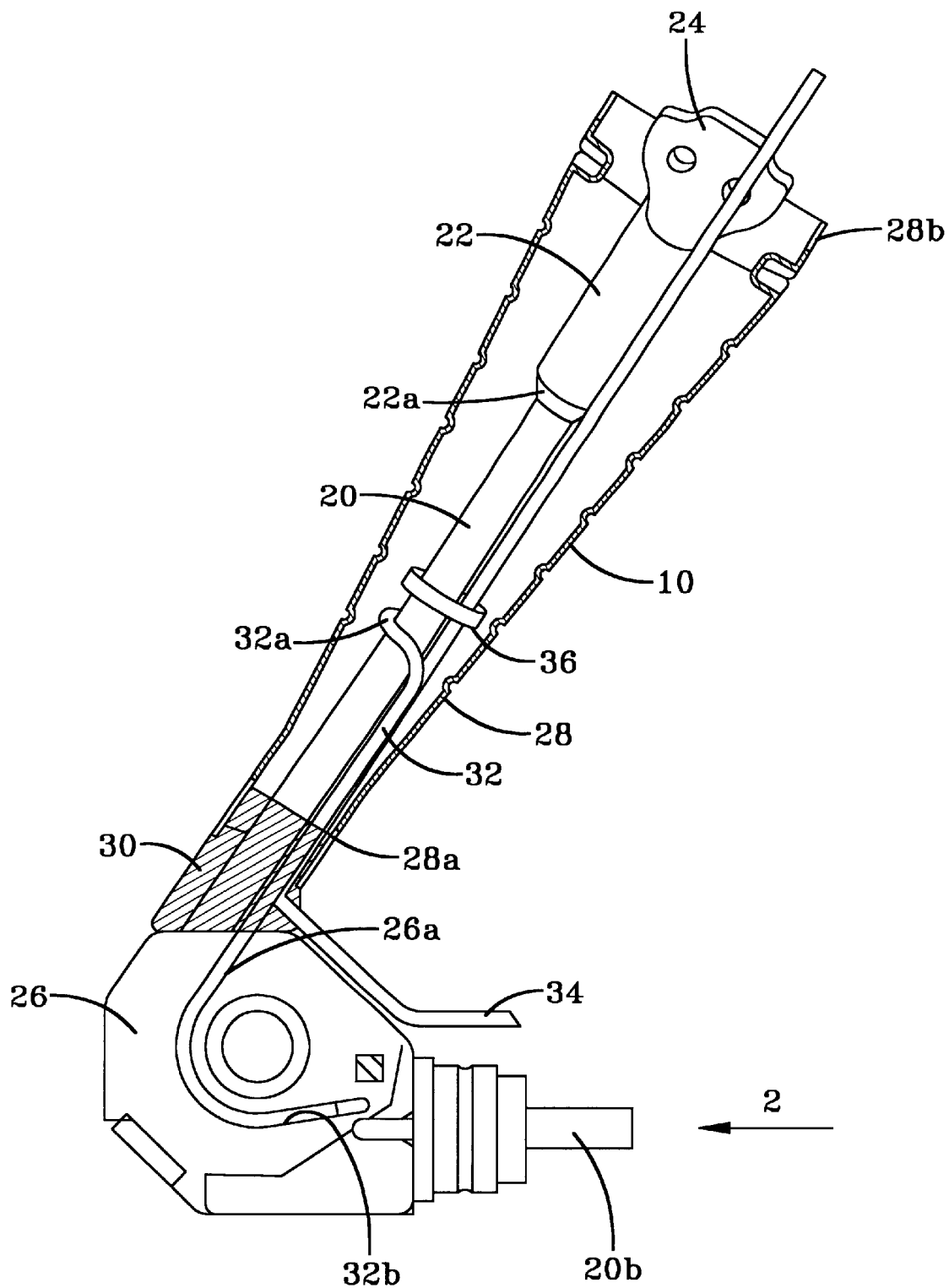
FIG. 1 is a schematic side view of a seat belt buckle carrier unit according to the invention.

A seat belt buckle carrier unit 10 according to the invention shown in FIG. 1 comprises a connecting element 20 in the form of a steel cable with which a buckle, (not shown) can be mounted, for example, on a vehicle chassis. For this purpose, the connecting element 20 has, at one of its ends, a larger diameter portion 22 with a buckle attachment member 24 for the buckle at its free end. A bevel 22a having a conical configuration is provided on the end of the larger diameter portion 22 distal from the buckle attachment member 24. The other end of the connecting element 20 is guided round a deflection device 26 which deflects the connecting element 20 from an orientation shown in FIG. 1 extending roughly at an angle of about 25° to the vertical into a substantially horizontal orientation, the free end 20b issuing from the deflection device 26 on the right. The seat belt buckle carrier unit 10 can be mounted by suitable fastening means on the vehicle chassis by means of the pretensioner (not shown) and/or the deflection device 26.

The connecting element 20 is received in a housing 28, preferably of a plastic material. The housing 28 extends from the buckle attachment member 24 of the larger diameter portion 22 of the connecting element 20 to just in front of the deflection device 26. A guide element 30 which is preferably made of plastic material and of which the function will be described in more detail hereinafter is provided between the deflection device 26 and the end 28a of the housing 28 directed toward the deflection device 26. The end 28b of the housing 28 opposite the guide element 30 still partially surrounds the buckle.

In the interior of the housing 28 there is arranged a fixing device. The fixing device can have a variety of designs. On the one hand, it is possible for the fixing device to be resilient in design. This enables the seat belt buckle carrier unit or the connecting element to be moved, if necessary, but to return to its predetermined defined position automatically on completion of this movement.

If the connecting element is arranged in a housing, the fixing device can be formed by at least one holding tab which is offset from the outer duct wall and can be fastened on a stationary point or part located inside the passenger space. The holding tab can be designed in such a way that it is also resilient to a certain extent so the seat belt buckle carrier unit and, in particular, the connecting element also remain movable in this case.

The fixing device can also be formed by at least one spring element which is fixed at one end and, with its free end, exerts a pressure on the connecting element. In this connection the pressure can also be exerted on the buckle.

To enable the spring element to be fixed in a compact, easy-to-assemble manner, the spring element can be fixed at one end on a deflection device for the connecting element, preferably by the formation of an insertion face shaped with an exact contour or a similar insertion duct.

The spring element can be a leaf spring but also may be a spring steel wire. In the exemplary embodiment of FIGS. 1 and 2, the fixing device is represented by spring steel wire 32.

Figure 2:
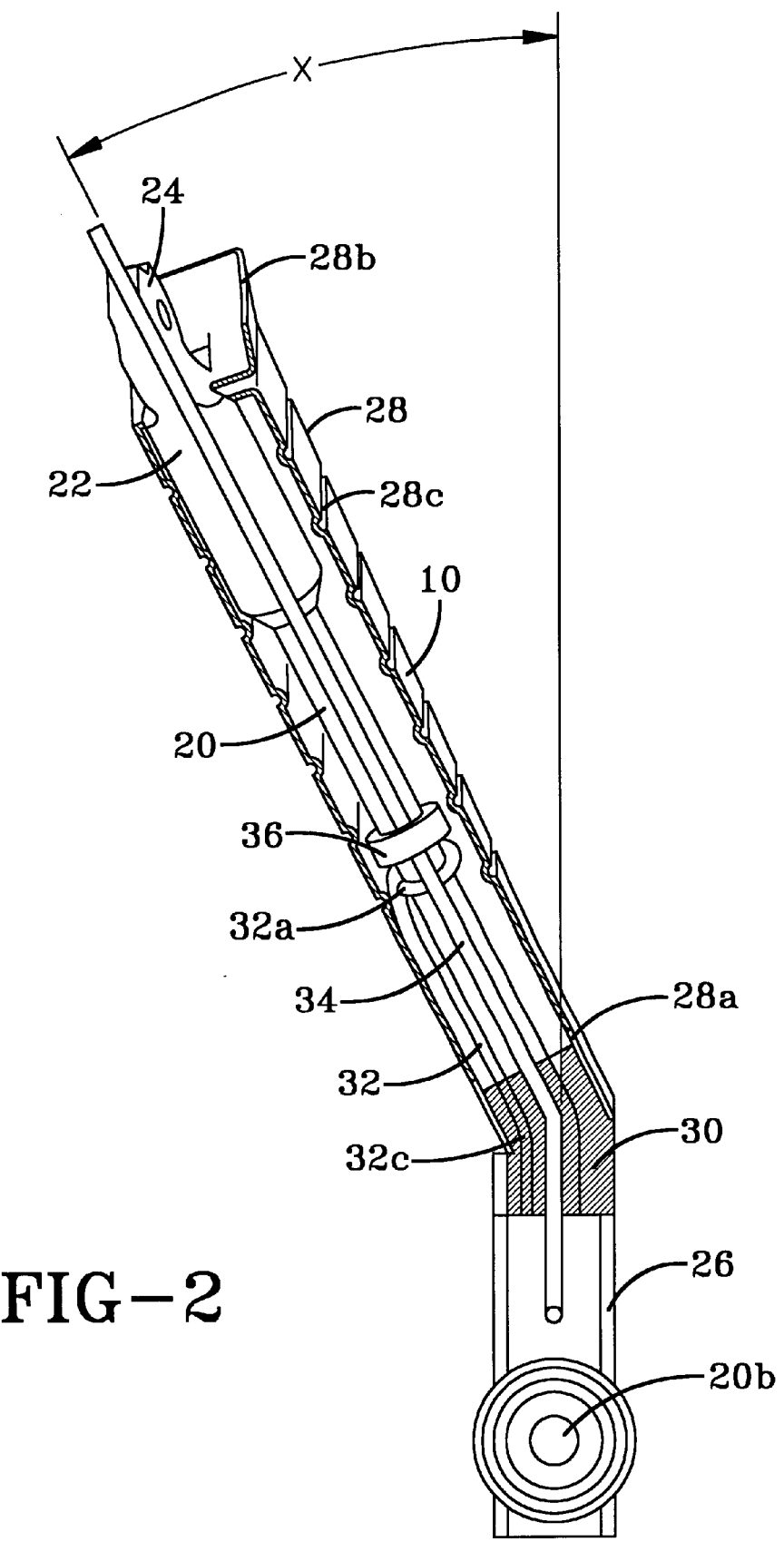
FIG. 2 is a view in the direction of the arrow 2 in FIG. 1.

The spring steel wire 32 applies pressure to the connecting element 20 resulting in the buckle positioned in a predetermined angular position relative to the vertical, as shown in FIG. 2. The spring steel wire 32 can be adjusted to alter the defined angle of the buckle in relation to the vertical. As shown in FIG. 2, the spring steel wire 32 has a bending point 32c in the region of the guide element 30. This bending point 32c serves to bend or deflect the spring steel wire 32 from the vertical in such a way that the seat belt buckle carrier unit 10 adopts the desired angle X in relation to the vertical.

FIG. 1 shows that the spring steel wire 32 extends substantially parallel to the connecting element 20. At its end directed toward the buckle attachment member 24, the spring steel wire 32 is designed with a loop 32a that surrounds the connecting element. The diameter of the loop 32a of the spring steel wire 32 can be selected in such a way that the connecting element 20 can move in different directions in the loop 32a but remains in contact with the loop 32a. At the end 32b opposite the loop 32a, the spring steel wire 32 is inserted in an insertion duct 26a of the deflection device 26 and similarly extends substantially parallel to the connecting element 20. The insertion duct 26a is so designed that the spring steel wire 32 is held positively in the insertion duct 26a so that the spring steel wire 32 is fixed by it at one end.

A pretensioner, not shown in detail, which pulls the connecting element 20 and therefore the buckle downwards in order to tension the seat belt in the event of a crash can act at this free end 20b of the connecting element 20. The housing 28 can be provided with depressions 28c, which allow the housing 28 to be pressed together to a defined extent in the case of a pretensioning process. The bevel 22a of the larger diameter portion of the connecting element 22 is so designed that it can penetrate into the loop 32a of the spring steel wire 32 or into the clip part 36 during a pretensioning process in order thus to drag these two parts downwards. The spring steel wire 32 is then bent or kinked in the region of the set bending point 32c and the further downward movement of the buckle or of the connecting element 20 is thereby dampened in the final phase of the pretensioning process. It is particularly advantageous if the set kink point is identical to the above-mentioned bending point 32c.

An electric lead 34 which serves to monitor the latching of the buckle when a passenger seat is occupied, similarly extends parallel to the connecting element 20 in the region of the housing 28. To prevent the electric lead 34 from breaking unintentionally as the seat belt buckle carrier unit 10 bends, a clip part 36 is provided which surrounds the connecting element 20 above the loop 32a of the spring steel wire 32 and guides the electric lead 34. Further protection is provided to the electric lead 34 by the guide part 30, which is provided between the lower end 28a of the housing 28 and the deflection device 26. This guide part 30 carries not only the electric wire 34 but also the spring steel wire 32. The guide part 30 also serves to position the housing 28 at its lower end. The guide part 30 is preferably made from plastic material.

While certain representative embodiments and details have been presented for the purpose of illustrating the invention, it will be apparent to those skilled in the art that various changes and modifications may be made therein without departing from the spirit and scope of the invention.

We claim:

1. A seat belt buckle carrier unit comprising at least one connecting element with which a buckle can be mounted at a buckle attachment member on a vehicle chassis, wherein the connecting element is arranged in a housing and is held in a specific position by a fixing device that is formed by at least one spring steel wire spring element having a free end and a fixed end and, with its free end, exerts a pressure on the connecting element, the spring steel wire has, at its end exerting a pressure on the connecting element, a loop that surrounds the connecting element and a clip is provided on the connecting element for holding at least one electric lead.

2. The seat belt buckle carrier unit according to claim 1 wherein the fixing device is resilient.

3. The seat belt buckle carrier unit according to claim 1 wherein the spring steel wire has a selected bending point for adjustment of a defined angle of the buckle in relation to the vertical.

4. The seat belt buckle carrier unit according to claim 1 wherein the diameter of the loop of the spring steel wire is selected in such a way that the connecting element can slide therein.

5. The seat belt buckle carrier unit according to claim 4 wherein the connecting element in the region of the buckle has a larger diameter than the loop of the spring steel wire.

6. The seat belt buckle carrier unit according to claim 5 wherein the larger diameter portion of the connecting element has a conical configuration at its lower end.

* * * * *